Aug. 30, 1932.   A. C. FURO   1,874,179
HEADLIGHT INDICATOR
Filed June 23, 1931
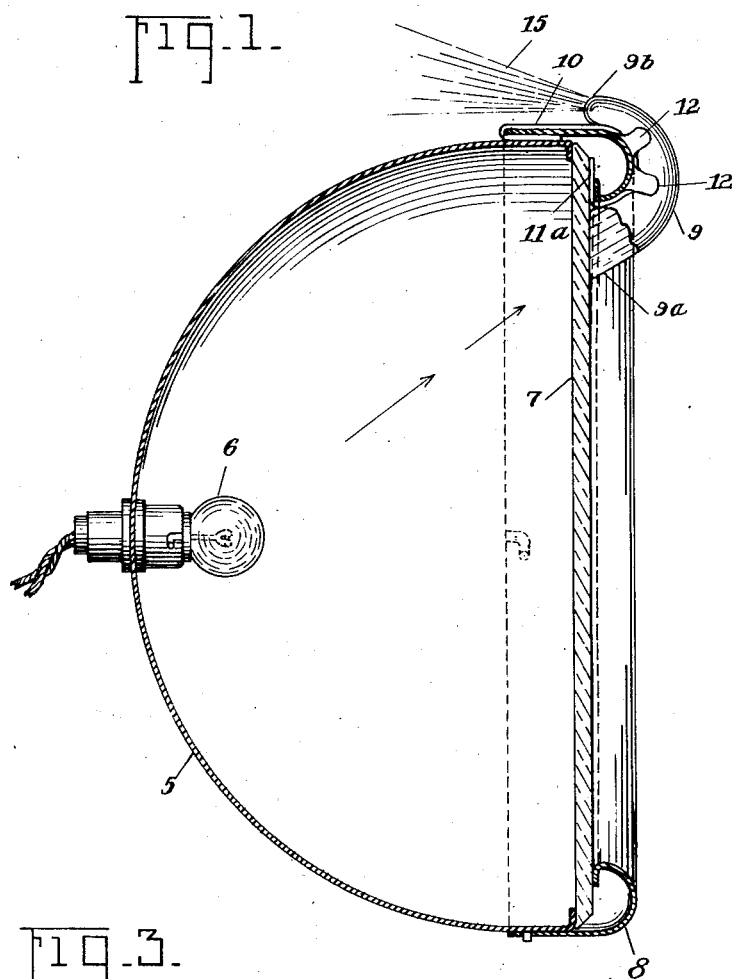
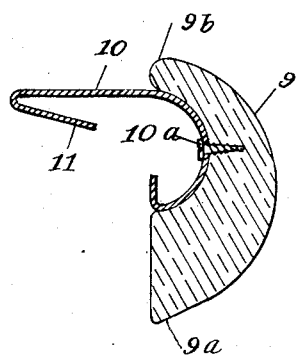
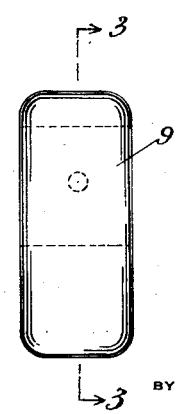
ANDRE C. FURO
INVENTOR Patented Aug. 30, 1932

1,874,179

UNITED STATES PATENT OFFICE

ANDRE CHRISTIAN FURO, OF ASTORIA, NEW YORK

HEADLIGHT INDICATOR

Application filed June 23, 1931. Serial No. 546,322.

This invention relates to headlight indicators and is intended to provide a device whereby the driver of an automobile may know whether or not the headlight is lit.

The invention will be fully and comprehensively understood from a consideration of the following detailed description when read in connection with the accompanying drawing which forms part of the application, with the understanding, however, that the improvement is capable of extended application and is not confined to the exact showing of the drawing nor to the precise construction described and, therefore, such changes and modifications may be made therefrom as do not affect the spirit of the invention nor exceed the scope thereof as expressed in the appended claim.

In the drawing:

Fig. 1 is a vertical section of a headlight reflector carrying a light bulb and the indicator invented by me, the indicator being attached to the reflector and shown partly in section.

Fig. 2 is a front view of the headlight indicator; and

Fig. 3 is a vertical section taken on line 3—3 of Fig. 2, looking in the direction of the arrows.

Referring to the drawing for a more detailed description thereof, the numeral 5 indicates a reflector carrying a light bulb 6. The reflector 5 carries a cover glass 7 held to the reflector by an annular flange 8 which is attached to the reflector. The headlight indicator of my invention comprises a curved body 9, the lower end of which is held against the upper part of the glass 7 by means of a holding member 10, which is secured to the curved body 9 by means of a screw 10a, being held to the reflector by the flange 8, the holding member being bent at its rear portion to provide a part 11 lying between the reflector and the flange 8. The holding member is bent at its lower end portion to provide a flange 11a which is inserted between the flange 8 and the glass 7 in order to firmly hold the indicating portion 9 in position.

The holding member comprises resilient lugs or prongs 12 which grip the body 9. The body 9 may be made of a material such for example as glass, celluloid, etc. to transmit the light from the lower end of the body to the upper end, the lower end of the body 9 being disposed in the path of rays emanating from the lamp or headlight while the upper end of the mentioned body is visible to the driver of an automobile or other vehicle. The rays from the headlight strike the lower end 9a of the light-transmitting body 9 and are carried to the upper end 9b of the mentioned body, from which they emanate as shown by the numeral 15 and are visible to the driver indicating to him that the headlight is lit. Obviously if the upper end 9b of the indicating body 9 is not illuminated the driver is aware that the headlight is not lit.

What is claimed as new is:

In combination with the rolled rim of a vehicle headlight, an indicator comprising a body of transparent material of concavo-convex form to bend around the roll of the rim, and a holding member conforming to and seating in the concave portion of the body and secured thereto and provided with an upturned flange extending behind the rim on the front and a bent-back portion constituting a forwardly extending flange projecting from the rear end of the holding member and engaging the rim on the inner periphery from the rear edge of the rim, the holding member having lateral lugs in lateral contact with the body on opposite sides.

In testimony whereof I hereby affix my signature.

ANDRE CHRISTIAN FURO.